US010595326B2

(12) United States Patent
Liao et al.

(10) Patent No.: US 10,595,326 B2
(45) Date of Patent: Mar. 17, 2020

(54) METHODS OF EFFICIENT DOWNLINK CONTROL INFORMATION TRANSMISSION

(71) Applicant: MEDIATEK INC., Hsinchu (TW)

(72) Inventors: Pei-Kai Liao, Hsinchu (TW); Yi-Ju Liao, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/835,745

(22) Filed: Dec. 8, 2017

(65) Prior Publication Data

US 2018/0167959 A1 Jun. 14, 2018

Related U.S. Application Data

(60) Provisional application No. 62/432,740, filed on Dec. 12, 2016.

(51) Int. Cl.
*H04W 72/12* (2009.01)
*H04W 72/04* (2009.01)
*H04L 5/00* (2006.01)

(52) U.S. Cl.
CPC .......... *H04W 72/121* (2013.01); *H04L 5/00* (2013.01); *H04L 5/0007* (2013.01); *H04W 72/042* (2013.01); *H04W 72/1273* (2013.01); *H04W 72/1289* (2013.01)

(58) Field of Classification Search
CPC ........ H04W 4/08; H04W 72/04; H04L 5/0053
See application file for complete search history.

(56) References Cited

U.S. PATENT DOCUMENTS

| 8,712,459 | B2 * | 4/2014 | Lim | H04W 4/06 |
| | | | | 455/519 |
| 9,319,851 | B2 * | 4/2016 | Yu | H04W 4/08 |
| 9,467,819 | B2 * | 10/2016 | Niu | H04W 4/06 |
| 9,473,906 | B2 * | 10/2016 | Yu | H04W 4/08 |

(Continued)

FOREIGN PATENT DOCUMENTS

| CN | 103238363 A | 12/2010 |
| CN | 104641576 A | 9/2012 |

(Continued)

OTHER PUBLICATIONS

International Search Report and Written Opinion of International Search Authority for PCT/CN2017/115527 dated Feb. 26, 2018 (9 pages).

(Continued)

*Primary Examiner* — Eric Nowlin
(74) *Attorney, Agent, or Firm* — Imperium Patent Works; Zheng Jin

(57) ABSTRACT

A method of downlink control information (DCI) transmission is proposed to enhance DCI transmission efficiency over physical layer signaling in cellular mobile communication networks. A serving base station uses a higher layer signaling, e.g., radio resource control (RRC) signaling message to configure a plurality of user equipments (UEs) to monitor UE-group DCI. When the UE is configured to monitor UE-group DCI, the UE monitors both unicast DCI and UE-group DCI in each corresponding scheduling time unit, e.g., a subframe in LTE. The candidate positions of the unicast DCI and the UE-group DCI can be orthogonal, partially overlapping, or fully overlapping with each other.

21 Claims, 4 Drawing Sheets

(56) References Cited

U.S. PATENT DOCUMENTS

| | | | |
|---|---|---|---|
| 9,603,163 B2 * | 3/2017 | Yi | H04W 72/121 |
| 9,872,123 B2 * | 1/2018 | Webb | H04L 5/0007 |
| 2011/0105162 A1 * | 5/2011 | Kim | H04L 1/001 455/500 |
| 2013/0286918 A1 | 10/2013 | Park et al. | 370/311 |
| 2014/0064216 A1 | 3/2014 | Agiwal et al. | 370/329 |
| 2014/0169312 A1 * | 6/2014 | Wang | H04W 48/12 370/329 |
| 2014/0226552 A1 * | 8/2014 | Niu | H04W 4/06 370/312 |
| 2014/0286223 A1 * | 9/2014 | Yu | H04W 4/08 370/312 |
| 2014/0286225 A1 * | 9/2014 | Yu | H04W 4/08 370/312 |
| 2014/0355493 A1 * | 12/2014 | Niu | H04W 76/40 370/280 |
| 2015/0009881 A1 * | 1/2015 | Yeh | H04W 4/06 370/312 |
| 2015/0245350 A1 * | 8/2015 | Webb | H04L 5/0007 370/329 |
| 2015/0282208 A1 * | 10/2015 | Yi | H04W 72/121 370/329 |
| 2016/0174194 A1 | 6/2016 | Suzuki et al. | 370/312 |
| 2016/0330697 A1 | 11/2016 | Chen et al. | 370/329 |
| 2016/0360551 A1 * | 12/2016 | Bergman | H04W 4/70 |
| 2017/0013618 A1 * | 1/2017 | Shin | H04W 72/0446 |
| 2017/0257860 A1 * | 9/2017 | Nam | H04L 27/2602 |
| 2018/0092070 A1 * | 3/2018 | Liao | H04L 1/0038 |
| 2018/0227887 A1 * | 8/2018 | Hakola | H04B 7/022 |
| 2018/0249481 A1 * | 8/2018 | Xu | H04L 1/1896 |
| 2018/0376476 A1 * | 12/2018 | Lee | H04W 72/042 |
| 2019/0165915 A1 * | 5/2019 | John Wilson | H04W 76/11 |
| 2019/0182829 A1 * | 6/2019 | Choi | H04W 72/0446 |

FOREIGN PATENT DOCUMENTS

| | | | | |
|---|---|---|---|---|
| CN | 102791036 B | * | 1/2016 | |
| CN | 108352937 A | * | 7/2018 | H04L 1/0038 |
| WO | WO-2015017983 A1 | * | 2/2015 | H04W 76/14 |
| WO | WO-2018054373 A1 | * | 3/2018 | H04L 1/0038 |

OTHER PUBLICATIONS

Taiwan IPO, office action for the TW patent application 106143331(no English translation is available) dated Feb. 21, 2019 (5 pages).

* cited by examiner

METHODS OF EFFICIENT DOWNLINK CONTROL INFORMATION TRANSMISSION

CROSS REFERENCE TO RELATED APPLICATIONS

This application claims priority under 35 U.S.C. § 119 from U.S. Provisional Application No. 62/432,740, entitled "Methods of Efficient Downlink Control Information Transmission," filed on Dec. 12, 2016, the subject matter of which is incorporated herein by reference.

TECHNICAL FIELD

The present invention relates generally to wireless communication systems and, more particularly, to methods of efficient downlink control information (DCI) transmission in mobile communication networks.

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipments (UEs). Orthogonal Frequency Division Multiple Access (OFDMA) has been selected for LTE downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE networks, Physical Downlink Control Channel (PDCCH) is used for downlink (DL) scheduling or uplink (UL) scheduling of Physical Downlink Shared Channel (PDSCH) or Physical Uplink Shared Channel (PUSCH) transmission. Typically, PDCCH can be configured to occupy the first one, two, or three OFDM symbols in a subframe. The DL/UL scheduling information carried by PDCCH is referred to as downlink control information (DCI).

The DCI format is a predefined format in which the downlink control information is formed and unicasted by a serving base station to each UE in PDCCH. The DCI format gives the UE details such as number of resource blocks, resource allocation type, modulation scheme, transport block, redundancy version, coding rate etc. Different DCI formats are defined in LTE to support different transmission schemes. In LTE, unicast DCI is supported, where a single DCI carries the scheduling information of DL/UL data for one specific UE only. For unicast DCI, each UE needs to blindly decode PDCCH over specified search spaces for a specific DCI format. Unicast DCI has its advantages and disadvantages. On the upside, the DCI overhead is proportional to the number of scheduled UEs within a scheduling time unit, e.g., subframe in LTE. On the downside, CRC bit is duplicated for each unicast DCI and it introduces high CRC overhead when there are multiple UEs scheduled in the same scheduling time unit. In addition, each unicast DCI usually has small information size (e.g., around 50 bits) and it cannot exploit sufficient channel coding gain. For example, Polar code, which is adopt in the next generation 5G system, has higher channel coding for the information size around 100 or larger bits. Such higher channel coding gain cannot be achieved for smaller DCI size.

A solution is sought to enhance DCI transmission efficiency.

SUMMARY

A method of downlink control information (DCI) transmission is proposed to enhance DCI transmission efficiency over physical layer signaling in cellular mobile communication networks. A serving base station uses a higher layer signaling, e.g., radio resource control (RRC) signaling message to configure a plurality of user equipments (UEs) to monitor UE-group DCI. When the UE is configured to monitor UE-group DCI, the UE monitors both unicast DCI and UE-group DCI in each corresponding scheduling time unit, e.g., a subframe in LTE, a slot in 5G NR. The candidate positions of the unicast DCI and the UE-group DCI can be orthogonal, partially overlapping, or fully overlapping with each other.

In one embodiment, a UE receives a higher layer signaling from a base station by in a mobile communication network, wherein the higher layer signaling carries configuration information for UE-group downlink control information (DCI) transmission. The UE monitors a physical layer signaling for a unicast DCI over a first set of scheduling time units and decoding the unicast DCI using a UE identity. The UE monitors the physical layer signaling for a UE-group DCI over a second set of scheduling time units when UE-group DCI transmission is enabled based on the configuration information and decoding the UE-group DCI using a UE-group identity. The unicast DCI carries data scheduling information for the UE. The UE-group DCI carries data scheduling information for a plurality of UEs sharing the same UE-group identity.

In another embodiment, an eNB transmits a higher layer signaling to a plurality of user equipments (UEs) in a mobile communication network. The higher layer signaling carries configuration information for UE-group downlink control information (DCI) transmission. The eNB unicasts a physical layer signaling for a unicast DCI over a first set of scheduling time units. The unicast DCI carries data scheduling information for one of the plurality of UEs. The eNB unicasts or multicasts the physical layer signaling for a UE-group DCI over a second set of scheduling time units when UE-group DCI transmission is enabled via the higher layer signaling. The UE-group DCI carries data scheduling information for each of the plurality of UEs.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
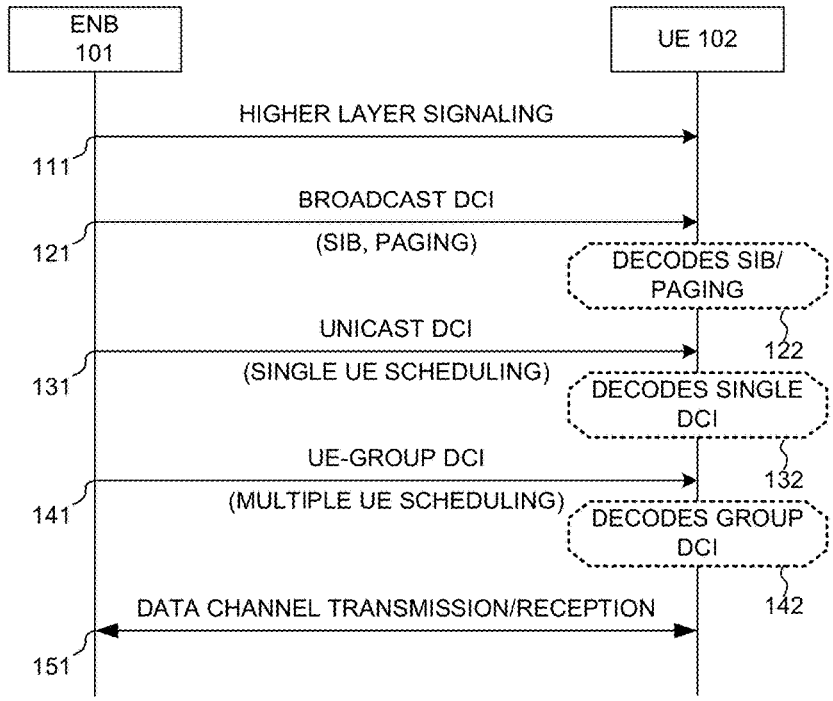
FIG. 1 illustrates a method of efficient downlink control information (DCI) transmission in physical downlink control channel in a cellular mobile communication network in accordance with one novel aspect.

FIG. 1 illustrates a method of efficient downlink control information (DCI) transmission in physical downlink control channel in a cellular mobile communication network in accordance with one novel aspect. The cellular mobile communication network comprises a serving base station eNB 101 and a plurality of user equipments including UE 102. In LTE networks, Physical Downlink Control Channel (PDCCH) is used for downlink (DL) scheduling or uplink (UL) scheduling of Physical Downlink Shared Channel (PDSCH) or Physical Uplink Shared Channel (PUSCH) transmission. The DL/UL scheduling information carried by PDCCH is referred to as downlink control information (DCI). The DCI format is a predefined format in which the downlink control information is formed and transmitted in PDCCH. The DCI format gives the UE details such as number of resource blocks, resource allocation type, modulation scheme, transport block, redundancy version, coding rate etc. Different DCI formats are defined in LTE to support different transmission schemes.

In LTE, in addition to broadcast DCI for broadcasting system information and paging information, unicast DCI is supported for each UE where a single DCI carries the scheduling information of DL/UL data for one specific UE only. For unicast DCI, each UE needs to blindly decode PDCCH over specified search spaces for a specific DCI format. Unicast DCI has its advantages and disadvantages. On the upside, the DCI overhead is proportional to the number of scheduled UEs within a scheduling time unit, e.g., subframe in LTE. On the downside, CRC bit is duplicated for each unicast DCI and it introduces high CRC overhead when there are multiple UEs scheduled in the same scheduling time unit. In addition, each unicast DCI usually has small information size (e.g., around 50 bits) and it cannot exploit sufficient channel coding gain. For example, Polar code, which is adopt in the next generation 5G system, has higher channel coding for the information size around 100 or larger bits. Such higher channel coding gain in general cannot be achieved for smaller DCI size.

In accordance with one novel aspect, a method to enhance DCI transmission efficiency is proposed where the concept of UE-group DCI transmission is introduced. A serving base station uses a higher layer signaling, e.g., radio resource control (RRC) signaling message to configure a UE to monitor UE-group DCI. When the UE is configured to monitor UE-group DCI, the UE monitors both unicast DCI and UE-group DCI in each scheduling time unit, e.g., a subframe or a slot in 5G NR. The candidate positions of the unicast DCI and the UE-group DCI can be orthogonal, partially overlapping, or fully overlapping.

In the example of FIG. 1, in step 111, eNB 101 transmits a higher layer signaling to UE 102. The higher layer signaling may be a radio resource control (RRC) message that semi-statically configures parameters related to UE-group DCI transmission. For example, the RRC message enables or disables UE-group DCI monitoring, with additional UE-group DCI monitoring parameters. In step 121, eNB 101 broadcasts or multicasts a single DCI via physical layer signaling to all UEs including UE 102. The broadcast DCI includes system information blocks (SIBs) or paging information. The broadcast DCI can be transmitted to all UEs within an analog beam or control beam. UEs within the analog beam or control beam are a subset of all UEs in a cell served by eNB 101. Different analog beams or control beams can be used to cover all UEs in the cell. The UE identification carried by the broadcast DCI is shared by all or a subset of UEs served by the cell. In step 122, UE 102 decodes the broadcast DCI. In step 131, eNB 101 unicasts a single DCI via physical layer signaling to UE 102. The unicast DCI carries a UE identification and includes the scheduling information of DL/UL data for UE 102 only, e.g., number of resource blocks, resource allocation type, modulation scheme, transport block, redundancy version, coding rate of DL/UL data for UE 102 with CRC. The UE identification carried by the unicast DCI is UE-specific. In step 132, UE 102 decodes the unicast DCI using the UE identification.

If UE-group DCI transmission is enabled via the RRC signaling in step 111, then in step 141, eNB 101 transmits (either unicasts or multicasts) a single DCI to a group of UEs, e.g., 4 UEs including UE 102. The UE-group DCI carries a UE-group identification the scheduling information of DL/UL data for each of the group of UEs with the same CRC. The UE-group identification carried by the DCI is shared by the group of UEs. In step 142, each of the group of UEs decodes the UE-group DCI using the UE-group identification and obtains its own scheduling information of DL/UL data. Because reduced CRC overhead is achieved for the UE-group DCI using the same CRC scheduling multiple UEs, and because higher coding gain can be achieved for the UE-group DCI with larger information size, DCI transmission efficiency is increased. Finally, in step 151, UE 102 performs uplink data transmission or downlink data reception over the scheduled data channel based on the unicast DCI and the UE-group DCI. Note that each UE can be associated with multiple UE identities, e.g., a first UE-specific identity for unicast DCI, and a second UE-group identity for UE-group DCI.

Figure 2:
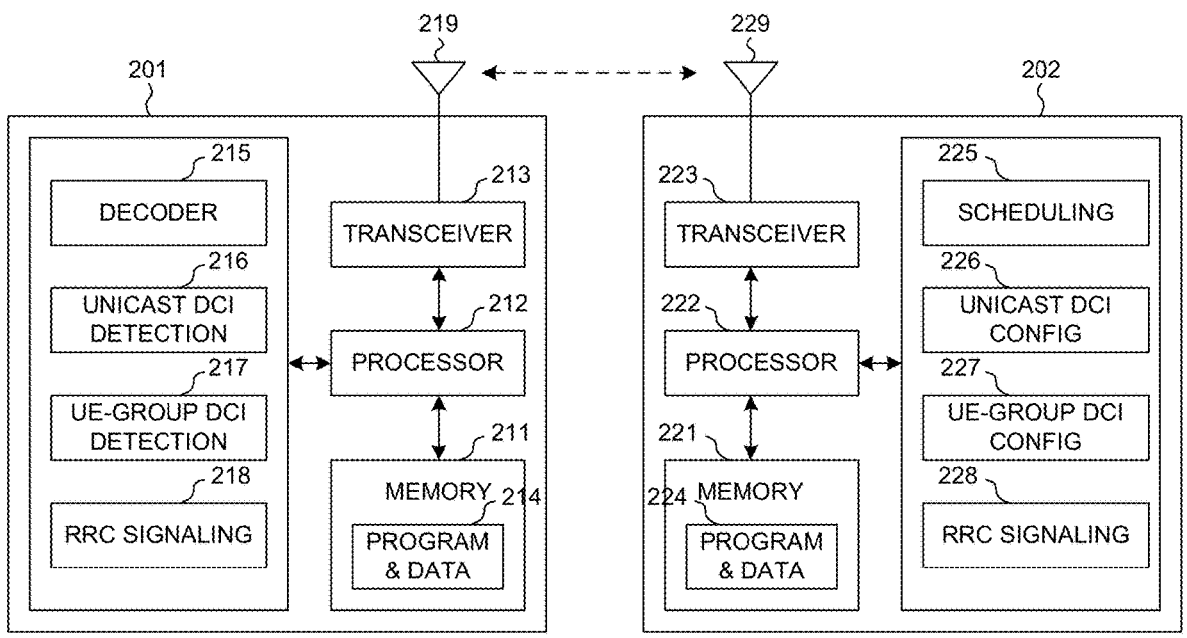
FIG. 2 is a simplified block diagram of a user equipment and a base station that carry embodiments of the present invention.

FIG. 2 is a simplified block diagram of a user equipment UE 201 and a base station eNB 202 that carry embodiments of the present invention. UE 201 comprises memory 211, a processor 212, an RF transceiver 213, and an antenna 219. RF transceiver 213, coupled with antenna 219, receives RF signals from antenna 219, converts them to baseband signals and sends them to processor 212. RF transceiver 213 also converts received baseband signals from processor 212, converts them to RF signals, and sends out to antenna 219. Processor 212 processes the received baseband signals and invokes different functional modules and circuits to perform features in UE 201. Memory 211 stores program instructions and data 214 to control the operations of UE 201. The program instructions and data 214, when executed by processor 212, enables UE 201 to receive higher layer and physical layer configuration for DCI configuration and transmission.

Similarly, eNB 202 comprises memory 321, a processor 222, an RF transceiver 223, and an antenna 229. RF transceiver 223, coupled with antenna 229, receives RF signals from antenna 229, converts them to baseband signals and sends them to processor 222. RF transceiver 223 also converts received baseband signals from processor 222, converts them to RF signals, and sends out to antenna 229. Processor 222 processes the received baseband signals and invokes different functional modules and circuits to perform features in eNB 202. Memory 221 stores program instructions and data 224 to control the operations of eNB 202. The program instructions and data 224, when executed by processor 222, enables eNB 202 to configure via higher layer and physical layer signaling of unicast DCI and UE-group DCI scheduling.

UE 201 and eNB 202 also comprise various function modules and circuits that can be implemented and configured in a combination of hardware circuits and firmware/software codes being executable by processors 212 and 222 to perform the desired functions. Each functional module or circuit may comprise a processor together with corresponding program codes. In one example, UE 201 comprises a decoder 215 that decodes the content of the detected unicast DCI and UE-group DCI, a unicast DCI detection circuit 216 that monitors and detects unicast DCI via blind detection, a UE-group DCI detection circuit 217 that monitors and detects UE-group DCI via blind detection, and an RRC configuration circuit 218 for obtaining higher layer message for DCI parameters. Similarly, eNB 202 comprises a scheduling module 225 that provides downlink scheduling and uplink grant, a unicast DCI configurator 226 that provides scheduling information for specific UE over physical layer signaling, an UE-group DCI configurator 227 that provides scheduling information for a group of UEs over physical layer signaling, and an RRC configuration circuit 228 for providing higher layer DCI parameters.

Figure 3:
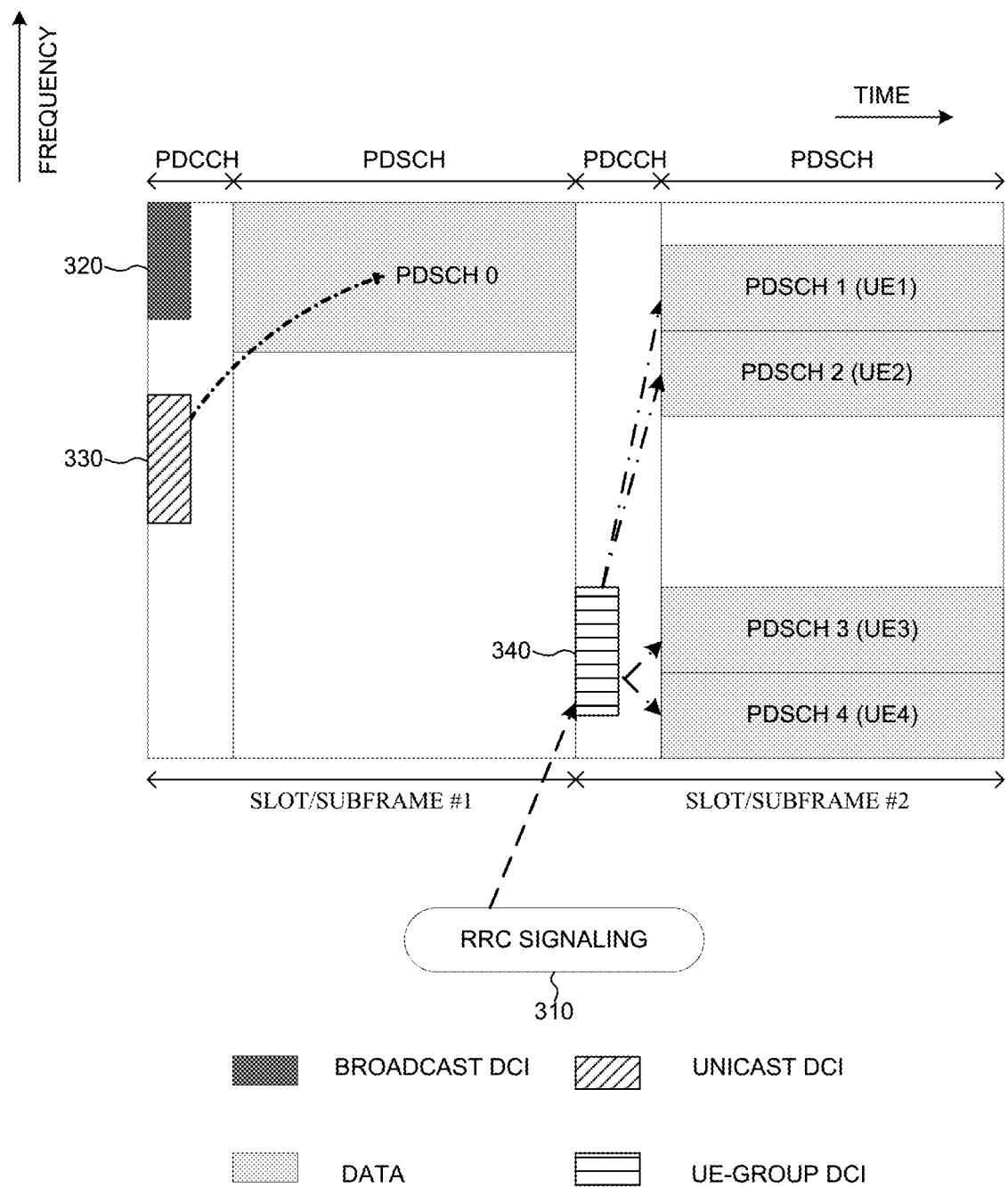
FIG. 3 illustrates different types of DCI configuration and transmission and corresponding scheduling time units of the different DCIs.

FIG. 3 illustrates different types of DCI configuration and transmission and corresponding scheduling time units of the different DCIs. After network entry and operation, a UE enters RRC connected mode and is served by its serving base station. The UE monitors broadcast or multicast DCI for broadcast or multicast messages in all or a first set of scheduling time units. For example, the first set of scheduling time units is one or more subframes or slots of every radio frame in LTE or NR systems. The UE also monitors unicast DCI for unicast DL/UL data scheduling in all or a second set of scheduling time units. The UE performs blind detection for the unicast DCI over a predefined candidate location (i.e., UE-specific search space in LTE)), where CRC bits are used by the UE for filtering out any false detections.

In addition to unicast DCI, the UE can receive RRC signaling (e.g., 310) to enable the monitoring of UE-group DCI for DL/UL data scheduling in a third set of scheduling time units. The RRC signaling 310 includes at least one or multiple of the following information with regard to UE-group DCI monitoring. First, a UE-group identification, e.g., similar to RNTI in LTE. The UE-group identification is carried by the UE-group DCI and shared by a group of UEs. Second, a third set of scheduling time units for the monitoring of the UE-group DCI in time domain. Third, the number of UEs scheduled in the UE-group DCI, e.g., four UEs. Fourth, the size of the UE-group DCI, because the UE-group DCI carries individual scheduling information for each of the group of UEs, the size can be different for different transmission schemes based on different DCI formats used for each individual UE. Fifth, the candidate position of the UE-group DCI in frequency domain, which defines the UE-group search space in LTE. Sixth, the arrangement of each UE's DL/UL data scheduling information. For UE-group DCI transmission, the individual scheduling information for each UE is arranged based on UE identification (e.g., C-RNTI in LTE), or higher-layer configuration, or a combination of UE identification and higher-layer configuration.

In the example of FIG. 3, when a UE is configured to enable the monitoring of UE-group DCI by RRC layer signaling 310, the UE performs the following of all three types of DCI transmission. First, the UE monitors broadcast or multicast DCI 320 for DL broadcast or multicast messages in all or a first set of scheduling time units. Second, the UE monitors unicast DCI 330 in subframe/slot #1 for unicast DL/UL data scheduling in all or a second set of scheduling time units. For example, unicast DCI 330 carries data scheduling information for the UE over PDSCH0 in subframe/slot #1. Third, the UE monitors UE-group DCI 340 in subframe/slot #2 for unicast or multicast DL/UL data scheduling in all or a third set of scheduling time units. For example, UE-group DCI 340 carries data scheduling information for a group of UEs (e.g., UE1-UE4) over PDSCH1, PDSCH2, PDSCH3, and PDSCH4 in subframe/slot #2, respectively. The first, second, and third sets of scheduling time units can be mutually orthogonal, partially overlapping, or fully overlapping with each other.

Such DCI transmission allows the network to choose whether to use UE-group DCI for DL/UL data scheduling. For example, if all UEs in a group sharing the same UE-group identification have DL/UL scheduling in a scheduling time unit, the network can use UE-group DCI transmission for DL/UL data scheduling to reduce the DCI overhead and exploit more channel coding gain. First, the UE-group DCI shares the same CRC, which reduces individual CRC as compared to unicast DCI. Second, the UE-group DCI has a larger size than unicast DCI, and thus can exploit more channel coding gain. On the other hand, if only one or part of UEs sharing the same UE-group identification have DL/UL data scheduling in a scheduling time unit, the network can use unicast DCI for DL/UL data scheduling to allow DCI overhead to be increased proportionally with the number of scheduled UEs.

The price paid to enable UE monitoring of both unicast and UE-group DCI is increased UE complexity on blind detection. To reduce the increase of UE complexity, the periodicity for UE-group DCI transmission is longer than that for unicast DCI. In addition, the number of candidate positions for UE-group DCI is smaller than that for unicast DCI.

Figure 4:
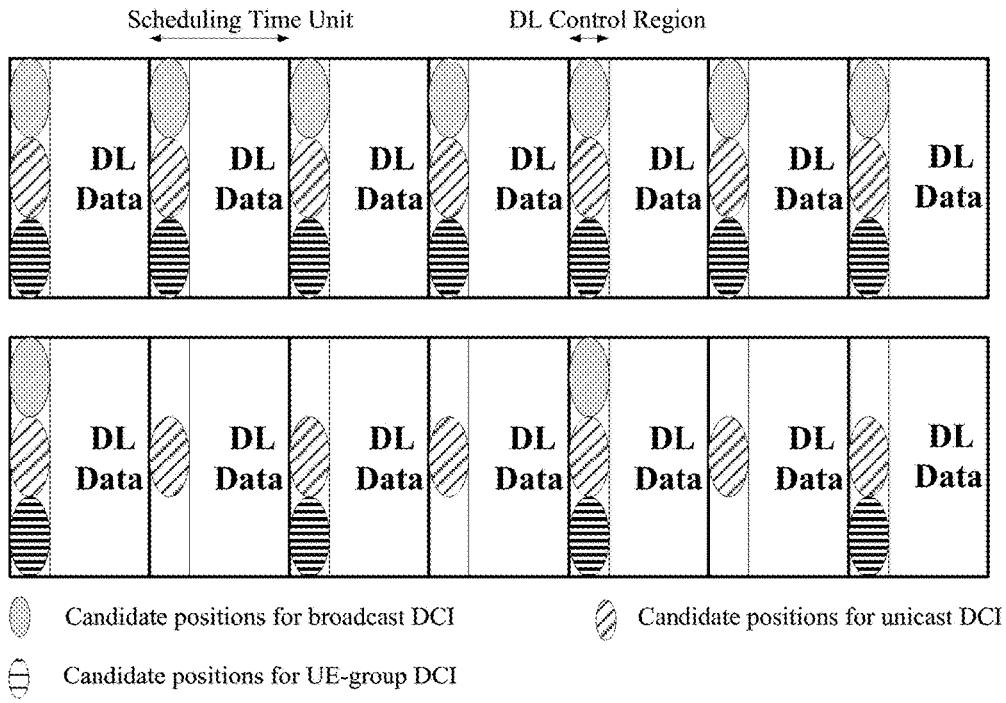
FIG. 4 illustrates different examples of DCI monitoring for three types of DCI transmission including broadcast DCI, unicast DCI, and UE-group DCI.

FIG. 4 illustrates different examples of DCI monitoring for three types of DCI transmission including broadcast DCI, unicast DCI, and UE-group DCI. In a first example as depicted by top of FIG. 4, UE monitors broadcast DCI, unicast DCI, and UE-group DCI in each scheduling time unit. In a second example as depicted by bottom of FIG. 4, UE monitors broadcast DCI every fourth scheduling time unit, monitors unicast DCI every scheduling time unit, and monitors UE-group DCI every second scheduling time unit. By increasing the periodicity for UE-group DCI transmission, UE complexity for monitoring UE-group DCI can be reduced.

Figure 5:
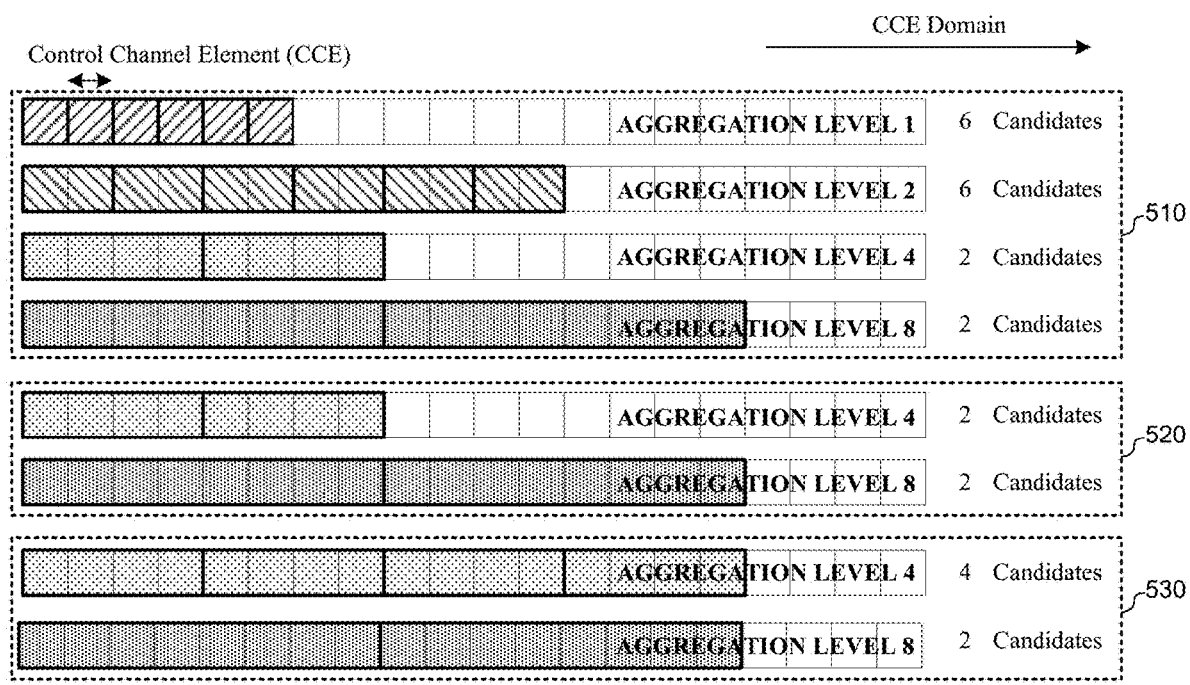
FIG. 5 illustrates different examples of candidate positions of unicast DCI and UE-group DCI in accordance with one novel aspect.

FIG. 5 illustrates different examples of candidate positions of unicast PDCCH carrying unicast DCI and UE-group PDCCH carrying UE-group DCI in accordance with one novel aspect. For DCI transmission, the PDCCH is encoded and occupies multiple control channel elements (CCEs) based on aggregation level. Resource elements (REs) (i.e., the basic units of the resource grid) are mapped to CCE forming the logical unit to carry DCI. If aggregation level is one, then it means that each PDCCH occupies one CCE. If aggregation level is two, then it means that each PDCCH occupies two CCEs, and so on so forth. In the example of FIG. 5, assuming UE-group PDCCH carries UE-group DCI for data scheduling information for up to a group of four UEs. Diagram 510 depicts examples of unicast PDCCH candidate positions. For aggregation level 1, each PDCCH occupies 1 CCE for 6 PDCCH candidates. For aggregation level 2, each PDCCH occupies 2 CCEs for 6 PDCCH candidates. For aggregation level 4, each PDCCH occupies 4 CCEs for 2 PDCCH candidates. For aggregation level 8, each PDCCH occupies 8 CCEs for 2 PDCCH candidates. Diagram 520 depicts a first example of candidate positions of UE-group PDCCH. In the first example, the candidate positions of UE-group PDCCH are a subset of the candidate positions of unicast PDCCH. Diagram 530 depicts a second example of candidate positions of UE-group PDCCH. In the second example, the candidate positions of UE-group PDCCH overlap with the candidate positions of unicast PDCCH with limited number of candidate positions outside the candidate positions of unicast PDCCH. By reducing the number of candidate positions for UE-group PDCCH, UE complexity for monitoring UE-group PDCCH can be reduced.

The enhanced DCI transmission scheme can be applied to single-stage DCI and the first stage of two-stage DCI. In single-stage DCI, each UE needs to blindly decode PDCCH over specified search spaces within a single step. In two-stage DCI, the DCI comprises a basic DCI and an extended DCI. The basic DCI provides basic scheduling information, e.g., resource allocation information of the scheduled data channel, wideband scheduling information, and information related to the extended DCI configuration. The extended DCI provides extended scheduling information of the scheduled data channel, e.g., transmission scheme for the scheduled data, indication of SU/MU-MIMO for the scheduled data, assistance information for interference cancellation, and subband scheduling information. The basic DCI can be transmitted to a group of UEs using the UE-group DCI transmission scheme. UE performs blind detection of the basic DCI only, while the location and size of the extended DCI can be provided by the basic DCI or provided by a higher layer signaling.

Figure 6:
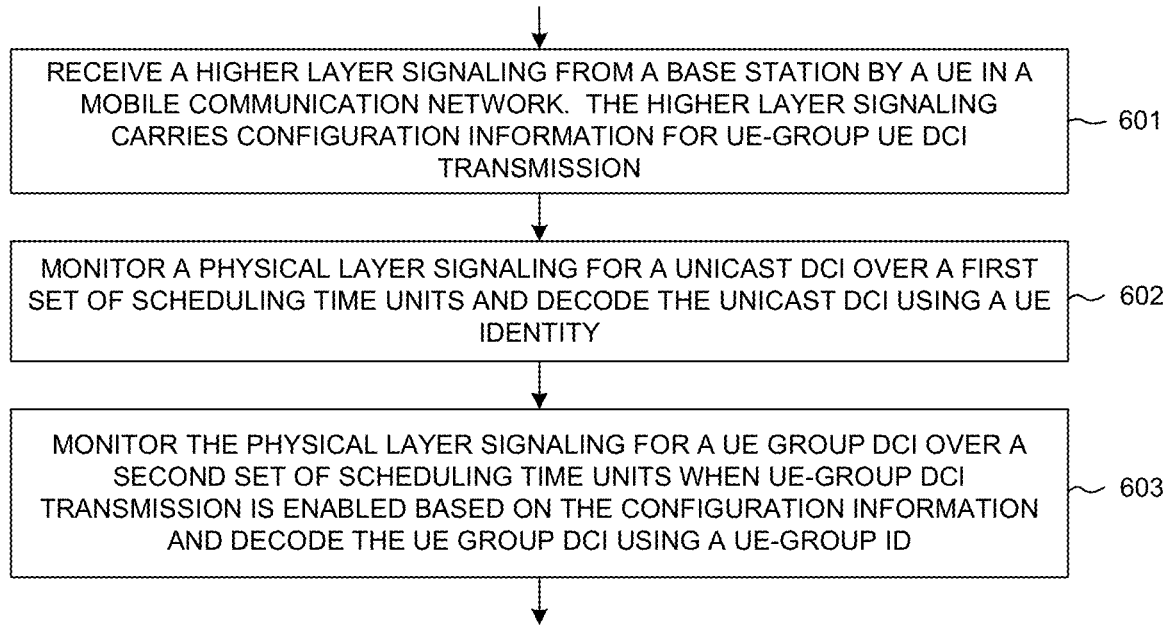
FIG. 6 is a flow chart of a method of efficient DCI transmission in downlink control channel from UE perspective in accordance with one novel aspect.

FIG. 6 is a flow chart of a method of efficient DCI transmission in downlink control channel from UE perspective in accordance with one novel aspect. In step 601, a UE receives a higher layer signaling from a base station by in a mobile communication network, wherein the higher layer signaling carries configuration information for UE-group downlink control information (DCI) transmission. In step 602, the UE monitors a physical layer signaling for a unicast DCI over a first set of scheduling time units and decoding the unicast DCI using a UE identity. In step 603, the UE monitors the physical layer signaling for a UE-group DCI over a second set of scheduling time units when UE-group DCI transmission is enabled based on the configuration information and decoding the UE-group DCI using a UE-group identity. The unicast DCI carries data scheduling information for the UE. The UE-group DCI carries data scheduling information for a plurality of UEs sharing the same UE-group identity.

Figure 7:
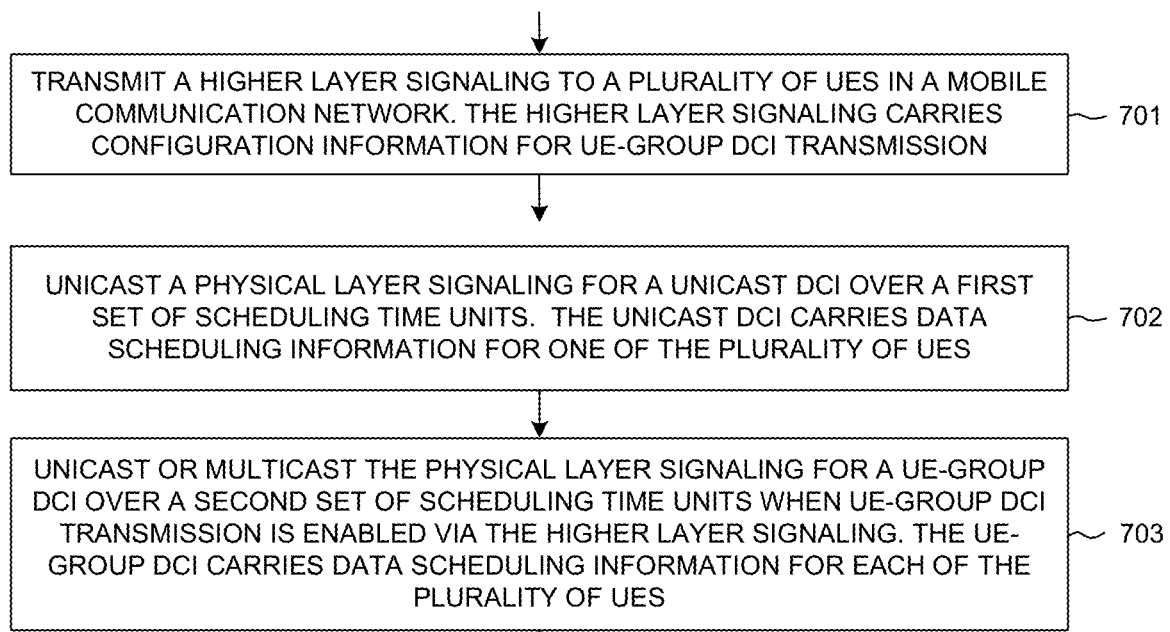
FIG. 7 is a flow chart of a method of efficient DCI transmission in downlink control channel from eNB perspective in accordance with one novel aspect.

FIG. 7 is a flow chart of a method of efficient DCI transmission in downlink control channel from a base station (eNB) perspective in accordance with one novel aspect. In step 701, the eNB transmits a higher layer signaling to a plurality of user equipments (UEs) in a mobile communication network. The higher layer signaling carries configuration information for UE-group downlink control information (DCI) transmission. In step 702, the eNB unicasts a physical layer signaling for a unicast DCI over a first set of scheduling time units. The unicast DCI carries data scheduling information for one of the plurality of UEs. In step 703, the eNB unicasts or multicasts the physical layer signaling for a UE-group DCI over a second set of scheduling time units when UE-group DCI transmission is enabled via the higher layer signaling. The UE-group DCI carries data scheduling information for each of the plurality of UEs.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving a higher layer signaling from a base station by a user equipment (UE) in a mobile communication network, wherein the higher layer signaling carries configuration information for UE-group downlink control information (DCI) transmission;
monitoring a physical layer signaling for a unicast DCI over a first set of scheduling time units and decoding the unicast DCI using a UE identity;
determining UE-group transmission is enabled based on the configuration information, wherein the configuration information comprises a second set of scheduling time units, and wherein the higher layer signaling comprises at least one of a number of UEs scheduled in the group DCI, a size of the UE-group DCI, and frequency domain positions of the UE-group DCI; and
monitoring the physical layer signaling for a UE-group DCI over the second set of scheduling time units and decoding the UE-group DCI using a UE-group identity, wherein the UE-group DCI has a set of candidate positions that overlaps with a set of candidate positions for the unicast DCI.

2. The method of claim 1, wherein the higher layer signaling comprises at least one of a number of UEs scheduled in the group DCI, a size of the UE-group DCI, and frequency domain positions of the UE-group DCI.

3. The method of claim 1, wherein the first set of scheduling time units and the second set of scheduling time units are mutually orthogonal, partially overlapped, or fully overlapped with each other.

4. The method of claim 1, wherein the UE-group DCI contains downlink or uplink data scheduling information for a plurality of UEs sharing the same UE-group identity.

5. The method of claim 4, wherein the data scheduling information for each of the plurality of UEs is arranged based on a corresponding UE identity and/or the higher layer signaling.

6. The method of claim 1, wherein the UE-group DCI has a set of candidate positions that is a subset of a set of candidate positions for the unicast DCI.

7. The method of claim 1, wherein the UE monitors a broadcast or multicast DCI over a third set of scheduling time units.

8. A user equipment (UE), comprising:
a radio frequency receiving that receives a higher layer signaling from a base station in a mobile communication network, wherein the higher layer signaling carries configuration information for UE-group downlink control information (DCI) transmission;

a monitor that monitors a physical layer signaling for a unicast DCI over a first set of scheduling time units, wherein the monitor also monitors the physical layer signaling for a UE-group DCI over a second set of scheduling time units upon determining that UE-group DCI transmission is enabled based on the configuration information, wherein the configuration information comprises the second set of scheduling time units, wherein the UE-group DCI has a set of candidate positions that overlaps with a set of candidate positions for the unicast DCI; and a decoder that decodes the unicast DCI using a UE identity, wherein the decoder also decodes the group DCI using a UE-group identity.

9. The UE of claim 8, wherein the higher layer signaling comprises at least one of a number of UEs scheduled in the group DCI, a size of the UE-group DCI, and frequency domain positions of the UE-group DCI.

10. The UE of claim 8, wherein the first set of scheduling time units and the second set of scheduling time units are mutually orthogonal, partially overlapped, or fully overlapped with each other.

11. The UE of claim 8, wherein the UE-group DCI contains downlink or uplink data scheduling information for a plurality of UEs sharing the same UE-group identity.

12. The UE of claim 11, wherein the data scheduling information for each of the plurality of UEs is arranged based on a corresponding UE identity and/or the higher layer signaling.

13. The UE of claim 11, wherein the UE-group DCI has a set of candidate positions that is a subset of a set of candidate positions for the unicast DCI.

14. The UE of claim 8, wherein the UE monitors a broadcast or multicast DCI over a third set of scheduling time units.

15. A method comprising:

transmitting a higher layer signaling from a base station to a plurality of user equipments (UEs) in a mobile communication network, wherein the higher layer signaling carries configuration information for UE-group downlink control information (DCI) transmission;

unicasting a physical layer signaling for a unicast DCI over a first set of scheduling time units, wherein the unicast DCI carries data scheduling information for one of the plurality of UEs;

enabling UE-group DCI transmission, wherein the configuration information comprises a second set of scheduling time units; and unicasting or multicasting the physical layer signaling for a UE-group DCI over the second set of scheduling time units, wherein the UE-group DCI carries data scheduling information for each of the plurality of UEs, wherein the UE-group DCI has a set of candidate positions that overlaps with a set of candidate positions for the unicast DCI.

16. The method of claim 15, wherein the higher layer signaling comprises at least one of a number of UEs scheduled in the group DCI, a size of the UE-group DCI, and frequency domain positions of the UE-group DCI.

17. The method of claim 15, wherein the first set of scheduling time units and the second set of scheduling time units are mutually orthogonal, partially overlapped, or fully overlapped with each other.

18. The method of claim 1, wherein the UE-group DCI contains downlink or uplink data scheduling information for a plurality of UEs.

19. The method of claim 18, wherein the data scheduling information for each of the plurality of UEs is arranged based on a corresponding UE identity and/or the higher layer signaling.

20. The method of claim 18, wherein the base station configures a set of candidate positions for the UE-group DCI that is a subset of a set of candidate positions for the unicast DCI.

21. The method of claim 15, wherein the base station broadcasts a broadcast-DCI over a third set of scheduling time units.

* * * * *